United States Patent

Fatato et al.

[11] Patent Number: 5,829,485
[45] Date of Patent: Nov. 3, 1998

[54] FOAM COATED CONVOLUTED TUBING

[75] Inventors: Francis B. Fatato, Exton; Lee H. Martin, West Chester, both of Pa.

[73] Assignee: Bentley-Harris Inc., Exton, Pa.

[21] Appl. No.: 872,158

[22] Filed: Jun. 10, 1997

[51] Int. Cl.[6] ................................................. F16L 11/00
[52] U.S. Cl. ......................... 138/121; 138/110; 138/156; 138/128
[58] Field of Search .................................. 138/121, 122, 138/110, 156, 118, DIG. 9, 128

[56] References Cited

U.S. PATENT DOCUMENTS

| | | | |
|---|---|---|---|
| 2,724,660 | 11/1955 | Ingalls et al. | 117/75 |
| 3,103,789 | 9/1963 | McDuff et al. | 61/11 |
| 3,318,336 | 5/1967 | Treiber | 138/121 |
| 3,374,634 | 3/1968 | Fochler | 61/10 |
| 3,566,607 | 3/1971 | Sixt | 138/121 X |
| 3,580,289 | 5/1971 | James, Jr. et al. | 138/121 |
| 4,274,455 | 6/1981 | Simons | 138/121 X |
| 4,854,416 | 8/1989 | Lalikos et al. | 181/207 |
| 4,967,799 | 11/1990 | Bradshaw et al. | 138/121 |
| 4,970,351 | 11/1990 | Kirlin | 138/121 X |
| 4,982,765 | 1/1991 | Usui | 138/122 |
| 5,246,973 | 9/1993 | Nakamura et al. | 521/54 |
| 5,324,557 | 6/1994 | Lupke | 138/DIG. 9 X |
| 5,435,871 | 7/1995 | Streit | 156/201 |
| 5,566,721 | 10/1996 | Breese | 138/145 |
| 5,613,522 | 3/1997 | Ford et al. | 138/123 |
| 5,715,870 | 2/1998 | Winter | 138/121 |

FOREIGN PATENT DOCUMENTS

| | | |
|---|---|---|
| 691720 | 1/1996 | European Pat. Off. . |
| 1175042 | 12/1969 | United Kingdom . |

*Primary Examiner*—Patrick F. Brinson
*Attorney, Agent, or Firm*—Synnestvedt & Lechner

[57] ABSTRACT

Convoluted tubing for automotive wiring harnesses and other elongated substrates is provided with sound dampening qualities by filling the valleys between convolutions with a flexible, resilient foamed composition, such as silicone rubber, and foaming the composition to cause expansion of the foam so that ribs of foam project radially from the valleys. In a preferred embodiment, spaced apertures are formed in the valleys to allow the expanding foam to form radially inwardly projecting fingers which contact the wiring harness and act to dampen vibrations. The corrugated tubing may be axially slit and the slit allowed to be filled with the foamed composition which, when foamed, eliminates noises caused by movement of the edge surfaces of the slit when torsional forces are applied to opposite ends of the tube.

18 Claims, 4 Drawing Sheets

FOAM COATED CONVOLUTED TUBING

FIELD OF THE INVENTION

This invention relates to convoluted, flexible, protective tubing used for the protection of elongated substrates, such as bundles of wire or tubular members, and is especially directed to the production of tubing for the dampening of vibration induced noise and the prevention of failure due to abrasion and fatigue.

BACKGROUND OF THE INVENTION

As used herein, the terms "corrugated", "convoluted" or "convolute" are used substantially interchangeably to describe known forms of plastic tubing having a surface formed with alternating ridges and grooves either on the tube outer surface, the inner surface or both. Such a corrugated or convoluted profile may be formed as a series of alternative ridges and grooves oriented in planes perpendicular to the tubular axis or as one or more helically extended ridges and grooves typically disposed at a small helical angle with respect to the tubular axis. In reference to helically extending ridges and grooves, each turn should be considered to mean a single ridge and groove in the specification and claims which follow.

Exemplary prior art tubes of the kind referred to are commonly used in the automotive industry where flexibility and the capability of protecting against abrasion are requisite properties. Typical of such products is the sleeve disclosed in U.S. Pat. No. 4,967,799 wherein an abrasion-resistant corrugated sleeve having a lengthwise slit is intended as an oversleeve for radiator hose in order to protect the radiator hose from wear caused by abrasion. For use in the protection of wiring harnesses, U.S. Pat. No. 4,970,351 provides a layer of sound deadening foam material to an axially slit corrugated tube for the purpose of eliminating rattles and unacceptable noise caused by vibration of the corrugated tube against other components in an engine compartment. The tubing disclosed in the '351 patent, while damping vibration from sources external to the tube, does not adequately protect against rattles and other vibrational noise caused by the vibration of the conductors themselves and tends to limit the tube's capacity to flex. Accordingly, a need has been recognized for tubing that provides adequate protection for bundles of wiring and other elongated substrates while effectively damping noise caused by sources external to the tubing, as well as noise caused by vibration of the wires or other substrates themselves.

SUMMARY AND OBJECTS OF THE INVENTION

In summary, a tubular article is provided having a convolute wall to which an elastic, flexible sound absorbent material, such as foamed silicone rubber, is applied. In accordance with the invention, the foam material fills the externally disposed grooves and, when foamed, it projects radially outwardly beyond the crests of the ridges, leaving the crests substantially free of said material so that a plurality of soft resilient spaced apart ribs extending transversely of the long axis of the tubular article are formed.

In a more specific, preferred embodiment, apertures are provided in the grooves at spaced intervals which serve as flow passages for the material during foaming so that soft resilient fingers project radially inwardly of the tubular article to contact and space the elongated substrates. The fingers act as energy absorbing members which absorb vibrational energy, preventing the substrates from rattling against the interior surface of the tubular article or abrading one another.

Still further, the tubular article is preferably axially split to allow for fitting over the elongated substrates which are already in place within an engine compartment. In a preferred form of the invention, the foam material lines the edges of the slit article so as to prevent squeaking noises from arising caused by torsional forces.

Methodwise, the invention comprises positioning a corrugated sleeve with an axial slit on a mandrel, filling the grooves with a liquid polymeric foamable material, foamable to produce a soft, resilient foam, foaming the material to cause expansion beyond the crests of the ridges between grooves while maintaining the crests substantially foam-free so that soft, resilient spaced apart ribs are formed as the foamed material expands. In a preferred embodiment, apertures are provided through the grooves for passage of the material during foaming so that radially extending fingers project inwardly to act as vibration damping spacers for the wires or other substrates. A further aspect of the invention involves maintaining the side edges of the axial slit separated during application of the foamable material so as to line the edges with foam during the foaming step.

Accordingly, an object of the invention is the provision of wiring harness sleeving which effectively eliminates rattles, squeaks and other noises caused by the vibrational noises to which components within the engine compartment of a vehicle are subjected.

A still further object of the invention is the provision of sound dampening conduit which is durable, flexible, easy to install and relatively inexpensive.

Still another object of the invention is the provision of an improved method for providing sound dampening conduits.

Other objects and advantages of the invention will become apparent from the following detailed description, claims and drawings.

DETAILED DESCRIPTION OF THE PREFERRED EMBODIMENTS OF THE INVENTION

Figure 1:
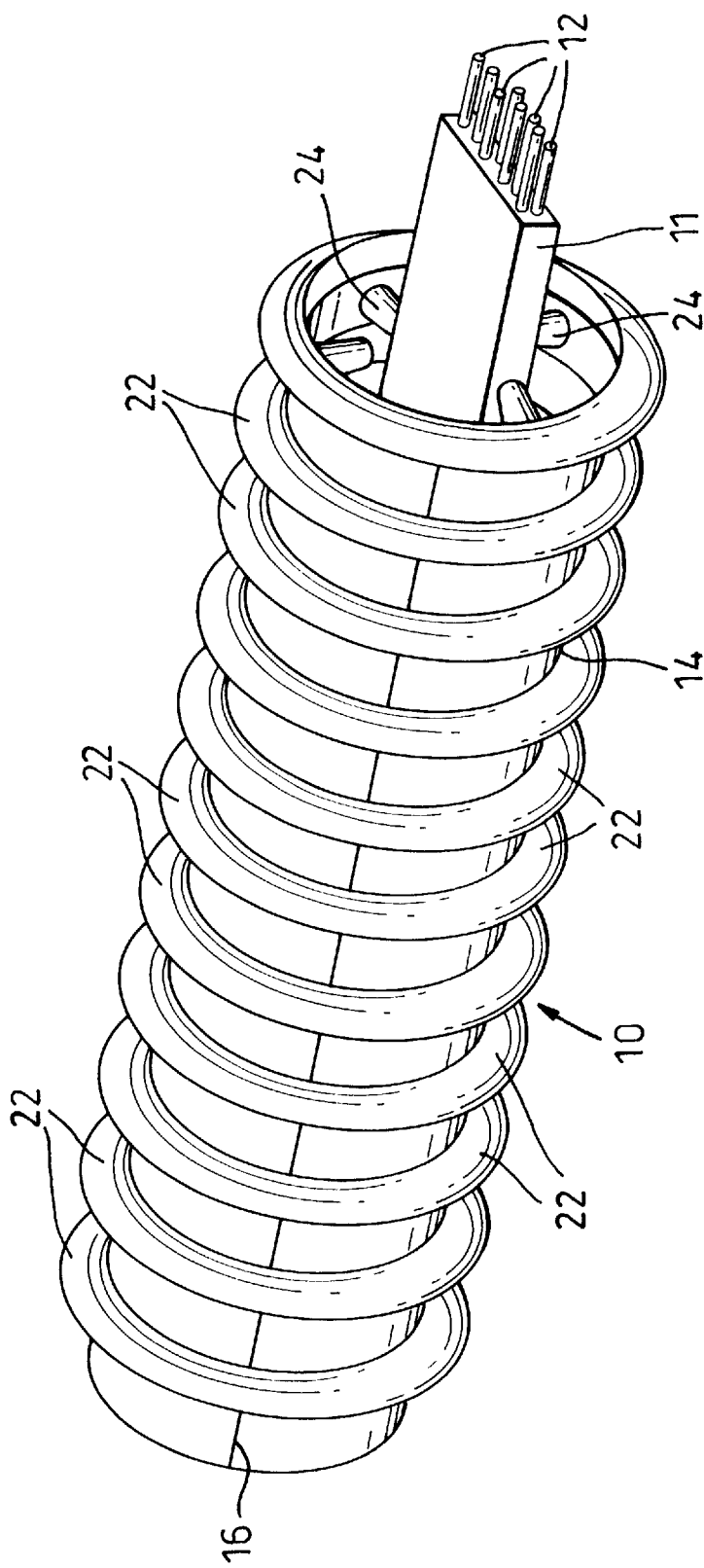
FIG. 1 is an isometric view of a corrugated tubular article incorporating the principles of the present invention.
Figure 2:
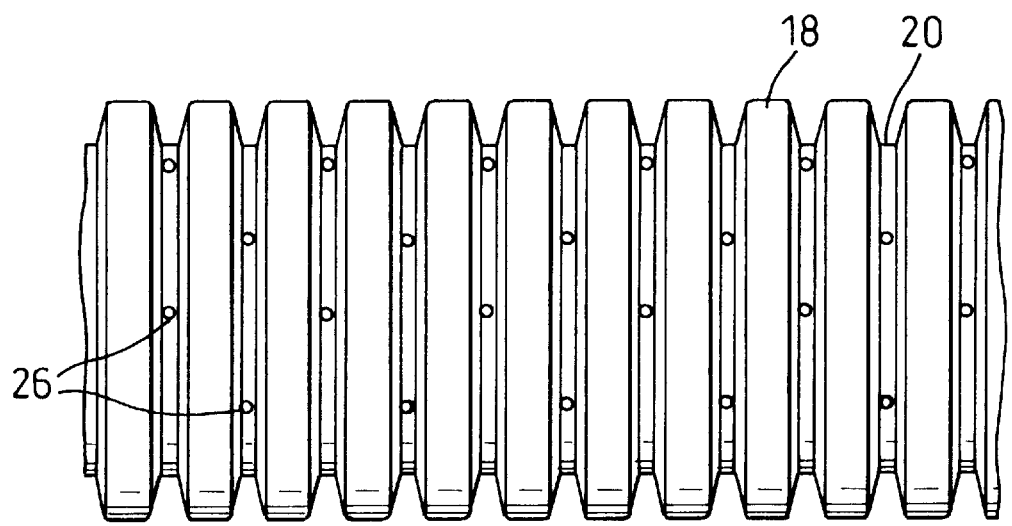
FIG. 2 is a side view of a corrugated tube used in forming the tubular article of FIG. 1.
Figure 2A:
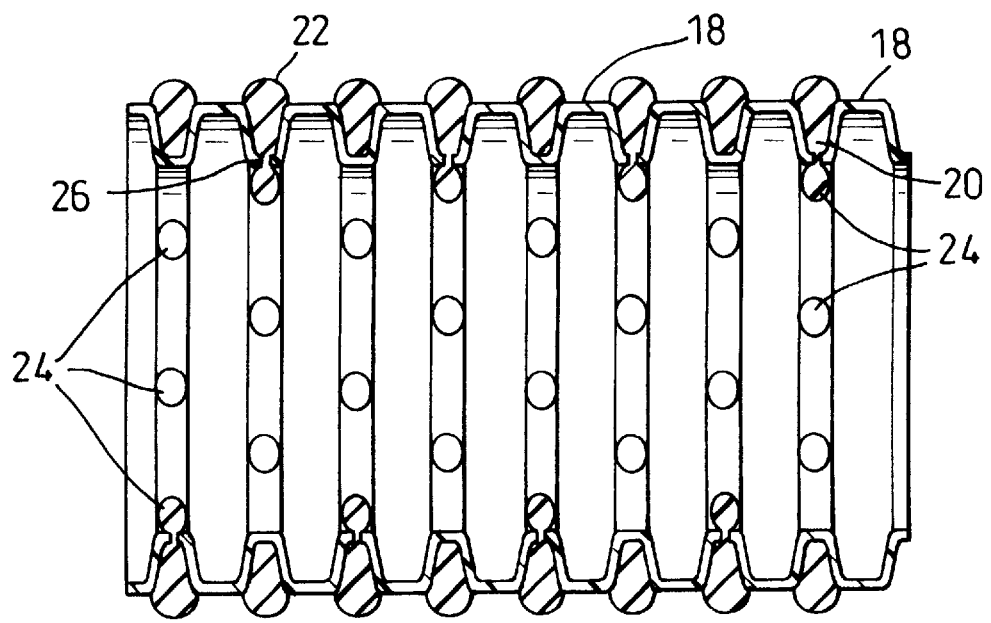
FIG. 2a is a longitudinal sectional view through the tubular article of FIG. 1.

With reference first to FIGS. 1–2a, a tubular article 10 made according to the present invention is shown as fitted over a cable 11 which houses a plurality of electric wires 12 comprising a vehicle wiring harness. The tubular article comprises a tube 14 which is split along one side, as indicated at 16. In accordance with prior practice, the tubular article 10 is preferably constructed of a resilient plastic material, such as a poly amide (nylon 6, 6/6 and 4/6). Flexibility is imparted to the conduit by the provision of the transversely oriented corrugations which are comprised of alternating ridges and grooves 18 and 20, as illustrated more particularly in FIGS. 2 and 2a.

The corrugations 18 and 20 may be provided as separate ridges and grooves extending transversely of the longitudinal axis of the tube or may be helically extended at a relatively small helix angle. As will be understood by those skilled in the art, other polymeric materials suitable for use in the fabrication of tube 14, dependent upon product application, include aliphatic and aromatic polyketones, fluorine based thermoplastics and polyvinylchlorides.

In carrying out the invention, it is preferred that a foamable material in liquid form be deposited within grooves 20. The foamable material should be soft and resilient and is preferably a liquid silicone rubber mixed with a foaming agent and foamed in place after application to the exterior surface of the tube. In carrying out a preferred embodiment of the invention, the liquid resin with foaming agent is applied to the outer surface as the tube passes through a circular die. The crests of the ridges of the tube are then wiped substantially free, and the resin is confined to the external grooves between corrugations. When foaming takes place, the resin within the grooves expands radially outwardly beyond the crests of the ridges, as shown in FIG. 2a, creating a series of radially extending soft and resilient spaced apart ribs 22.

In preferred form, means are provided for the application of the foamed material to the inside of the tubular article, preferably in the form of inwardly projecting nodules or fingers 24 which serve as positioning and sound dampening members for damping noise caused by vibrations of the wires or other substrates against the inside surface of the tube. A preferred way for carrying out this aspect of the invention is to form a multiplicity of circumferentially spaced apertures 26 within each groove 20. The apertures provide a flow path for expanding foam material. During expansion of the resin, fingers of foamed material are extruded through the apertures 26. Preferably, the apertures in one groove are offset with respect to those in the next so that fingers are projecting towards the harness from substantially all angles along a relatively short length of tube.

Although other resilient sound damping materials may be employed, such as polyurethane, nitrile, polyvinylchloride and EPDM vinyl plastisols, fluoropolymers or other elastomer-based foamable materials, heat activatable silicone rubber foams provide excellent results and are preferred for this application. These foams are widely used in the automotive industry for parts within vehicles in view of their durability and heat resistance. A particularly preferred silicone rubber foamable material is disclosed in U.S. Pat. No. 5,246,973 dated Sep. 21, 1993, which is incorporated herein by reference. The foams of the '973 patent are comprised of a thermosetting liquid silicone rubber composition and thermally expansible hollow plastic microparticles. Upon heating to bring about thermosetting, the microparticles function as a foaming agent by thermally expanding without generation of toxic gases during the foaming process. The resulting product has uniform microcells which have excellent sound damping characteristics and is light in weight. When applied to corrugated tubular articles as described, the tubular article effectively dampens both internally and externally generated vibration induced noise. An important advantage is that flexibility of the tubular article is relatively unimpaired.

In carrying out the method of the invention, the sleeving is preferably fitted over a mandrel 30 fitted on a support 31 and passed through a die housing 32 in which a metering feeder, or other suitable feed means, provides a foamable composition in liquid form through a circumferentially disposed passage 34, the composition being as described, for example, in the aforesaid '973 patent. Preferably, the mandrel 30 has an outside diameter large enough to maintain the side edges of slit 16 separated as the resin is delivered. As a consequence, resin is delivered not only to the external grooves in the outer surface of the corrugated tube but flows into the space between the separated side edges of the slit 16. As the tube exits from the forming head, the crests of the ridges between the grooves are wiped substantially clean. A small amount of resin on the ridges may be tolerated so long as it does not appreciably interfere with the flexibility of the tube when the resin is foamed.

Following the application of resin, the tubing is passed through a tubular heater which causes the resin to set and the microspheres to expand. As the microspheres expand, the resin is forced through the apertures 26 so as to form nodules 24, at the same time expanding radially outwardly forming spaced, continuous ribs 22. In the preferred embodiment, the foaming of the resin between the edges of slit 16 provides a coating of resin for the edges which adheres to these edges even when the slit is open.

Figure 3A:
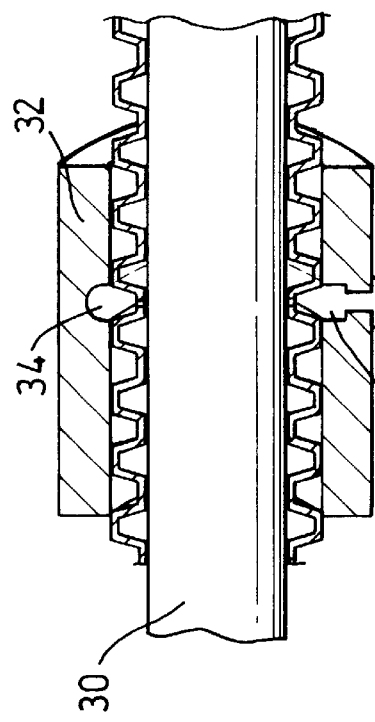
FIGS. 3–3b are views schematically illustrating a preferred method and apparatus for carrying out the invention.
Figure 3:
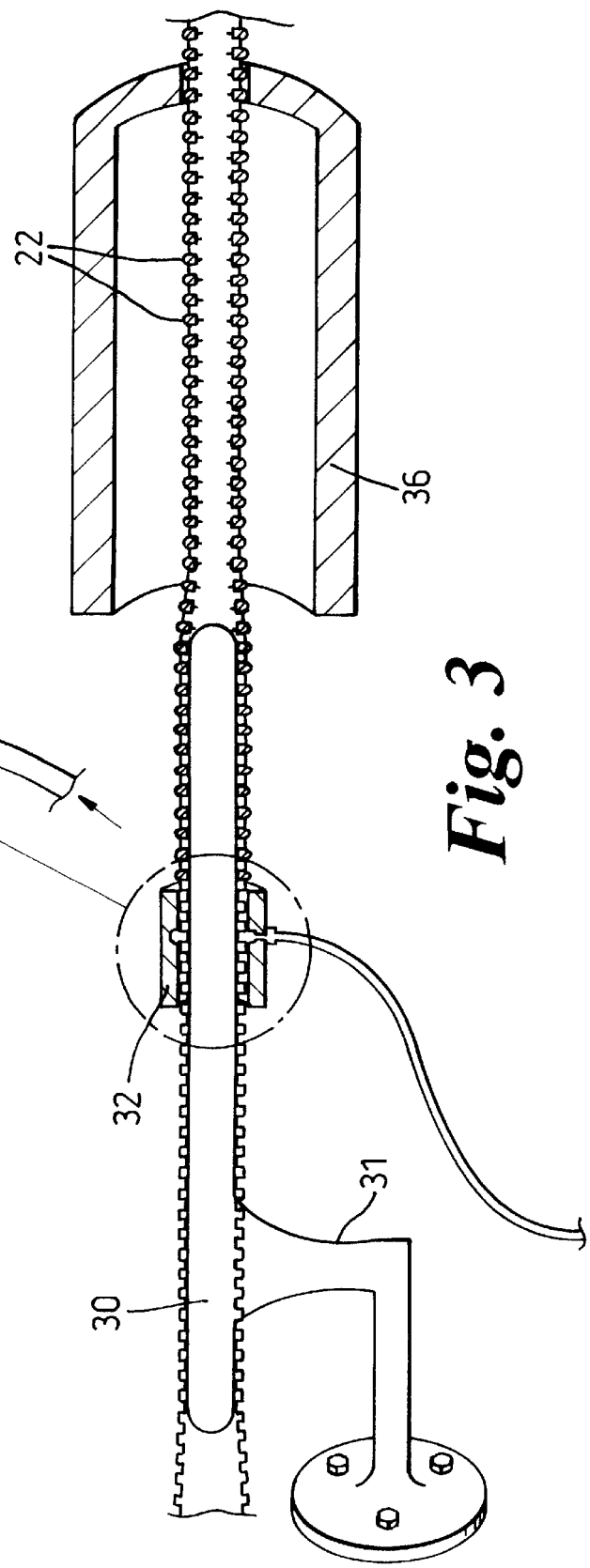
Figure 3B:
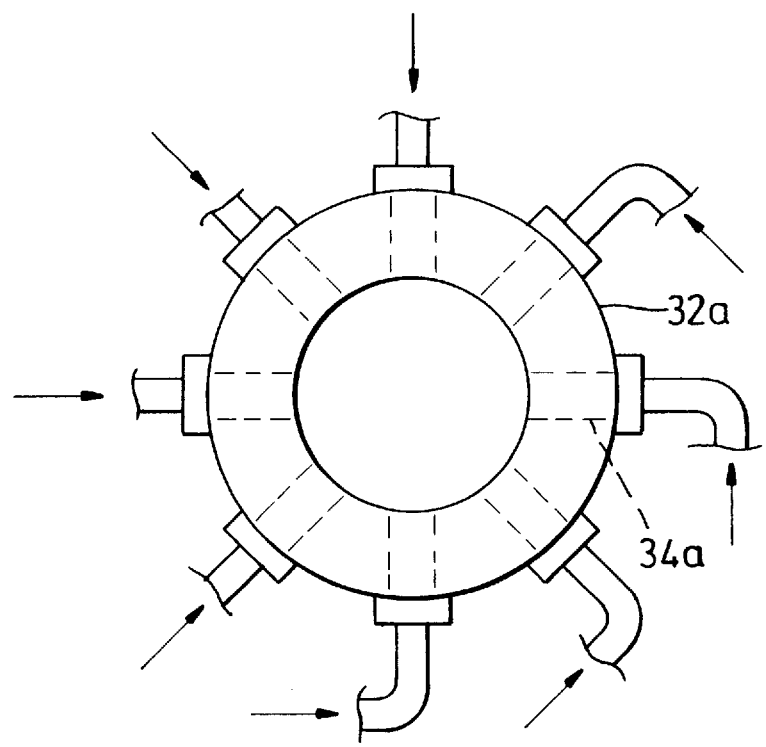

In an alternative form of the invention, the foamable composition may be applied as a plurality of elongated strips extended parallel to the long axis of the tube through a die housing 32a, shown in FIG. 3b. In the housing of FIG. 3b, radial ports 34a deliver liquid foam composition from a manifold, not shown, at a plurality of locations, preferably equally spaced around the tube circumference. As the tube exits the die, the crests between the grooves are wiped clean of resin. When the resin is foamed, a multiplicity of nodules of foamed material project radially outwardly from the crests of the convolutions acting as vibration dampeners in a manner similar to the ribs of FIGS. 1–3a.

The foamed fingers within the sleeve dampen vibration induced sound which would otherwise be caused by intermittent contact of the wires or other substrate with the interior surface of the sleeve, and the external ribs of foam function as dampeners of sound energy caused by the vibration of other components in the engine compartment which might otherwise contact the surface of the tube. The lining of slit 16 eliminates squeaks caused by twisting movement of the ends of the sleeve as, for example, when the vehicle encounters rough road conditions.

As will be readily apparent to those of ordinary skill in the art, various modifications of the invention as described may be made without departing from the scope thereof as defined in the following claims.

We claim:

1. A flexible tubular sleeve having a wall comprised of alternating ridges and valleys having a flexible, resilient foamed composition applied to said valleys;

the crests of ridges of said tubular sleeve being substantially clear of said foamed composition, while the foamed composition within the valleys between ridges of tubular sleeve remains; and the foamed composition in the valleys being expanded outwardly beyond said crests to form discrete spaced projections of foamed material, said discrete foam projections being resilient and energy absorptive.

2. A flexible sleeve according to claim 1, wherein said projections are in the form of continuous ribs.

3. A tubular sleeve according to claim 2, said tubular sleeve wall having an inner surface and members comprised of said composition projecting inwardly from said tubular sleeve wall.

4. A corrugated tubular sleeve according to claim 3, wherein said inwardly projecting members comprise discrete fingers of said foamed composition projecting radially inwardly said tubular sleeve wall.

5. A corrugated tubular sleeve according to claim 4, wherein said tubular sleeve further comprises spaced apertures formed in the valleys between the ridges of said corrugated tubular sleeve, said apertures extending through the tubular sleeve, said foamed composition extending through said apertures and projecting radially inwardly from said tubular sleeve wall.

6. A corrugated tubular sleeve according to claim 5, said tubular sleeve having a lengthwise extending slit and a layer of resilient material separating the edges of said slit.

7. A corrugated tubular sleeve according to claim 6, wherein said flex resilient foamable composition extends between the edges of said slit.

8. A corrugated tubular sleeve according to claim 5, wherein said composition comprises a silicone rubber.

9. A corrugated tubular sleeve according to claim 8, wherein said silicone rubber composition is a thermosetting liquid silicone rubber composition.

10. A corrugated tubular sleeve according to claim 9, wherein said composition further comprises thermally expandable hollow plastic microparticles, said microparticles being present in amounts of 0.1 to 30 wt. parts to 100 wt. parts of said thermosetting liquid silicone rubber composition.

11. A flexible tubular member having a convolute wall comprised of alternating externally and internally disposed ridges and grooves oriented substantially transversely of the longitudinal axis;

an elastic flexible sound absorbent material deposited within said externally disposed grooves, said material extending radially outwardly beyond the ridges, the ridges being substantially free of said elastic, flexible material.

12. A tubular member according to claim 11, further including spaced orifices extending through the external grooves and exiting on the internal ridges, said elastic flexible material projecting through said orifices and terminating radially inwardly of the convolute wall.

13. A tubular member according to claim 12, wherein the wall of said tubular member further includes a slit extending along the length thereof, said elastic, flexible material being extended through said slit.

14. A tubular member according to claim 13, wherein said material is a foamed silicone rubber.

15. A tubular member according to claim 14, wherein said foamed silicone rubber is foamed within said externally disposed grooves.

16. A flexible tubular article for the protection of a wiring harness comprised of plural electric wires, said tubular article comprising:

a tubular wall;

a soft, resilient foam material deposited on the outer surface of said tubular wall; and said wall having rows of spaced apertures extending therethrough, said foam extending through said apertures and terminating in inwardly projected fingers engagable with said wires, said tubular wall further including a longitudinal slit having adjacent edge portions lined with said foam.

17. A flexible tubular article for the protection of a wiring harness comprised of plural electric wires, said tubular article comprising:

a tubular wall;

a soft, resilient foam material deposited on the outer surface of said tubular wall; and said wall having rows of spaced apertures extending therethrough, said foam extending through said apertures and terminating in inwardly projected fingers engagable with said wires, said tubular wall having a corrugated profile having alternating internal and external ridges and grooves, wherein said foam material is deposited within said external grooves, said foam material being expanded to project beyond said ridges as substantially circular radially extended ribs, the external ridges between said ribs being substantially free of said expanded foam material.

18. A flexible cylindrical article for the protection of a wiring harness comprised of plural electric wires, said cylindrical article comprising:

a tubular wall;

a soft, resilient foam material deposited on the outer surface of said tubular wall; and said cylindrical wall having circumferentially disposed rows of spaced apertures extending therethrough, the apertures in one row being circumferentially offset with respect to the apertures in adjacent rows and being located at positions disposed substantially around the wall circumference, said foam extending through said apertures and terminating in inwardly projected fingers engagable with said wires.

* * * * *